C. H. McCormick. 3 Sheets. Sheet 1.

Mower.

No 1255 Reissued Jan. 7. 1862.

Witnesses.

Thos. H. Dodge

John P. Jacobs

C. H. McCormick

Sheet 2. 3 Sheets

C. H. McCormick.

Mower.

No 1255

Reissued Jan. 7. 1862.

Witnesses.

Thos. H. Dodge

John C. Jacobs

C. H. McCormick

Sheet 3. 3 Sheets.
C. H. McCormick
Mower.
No. 1255
Reissued Jan. 7. 1862.
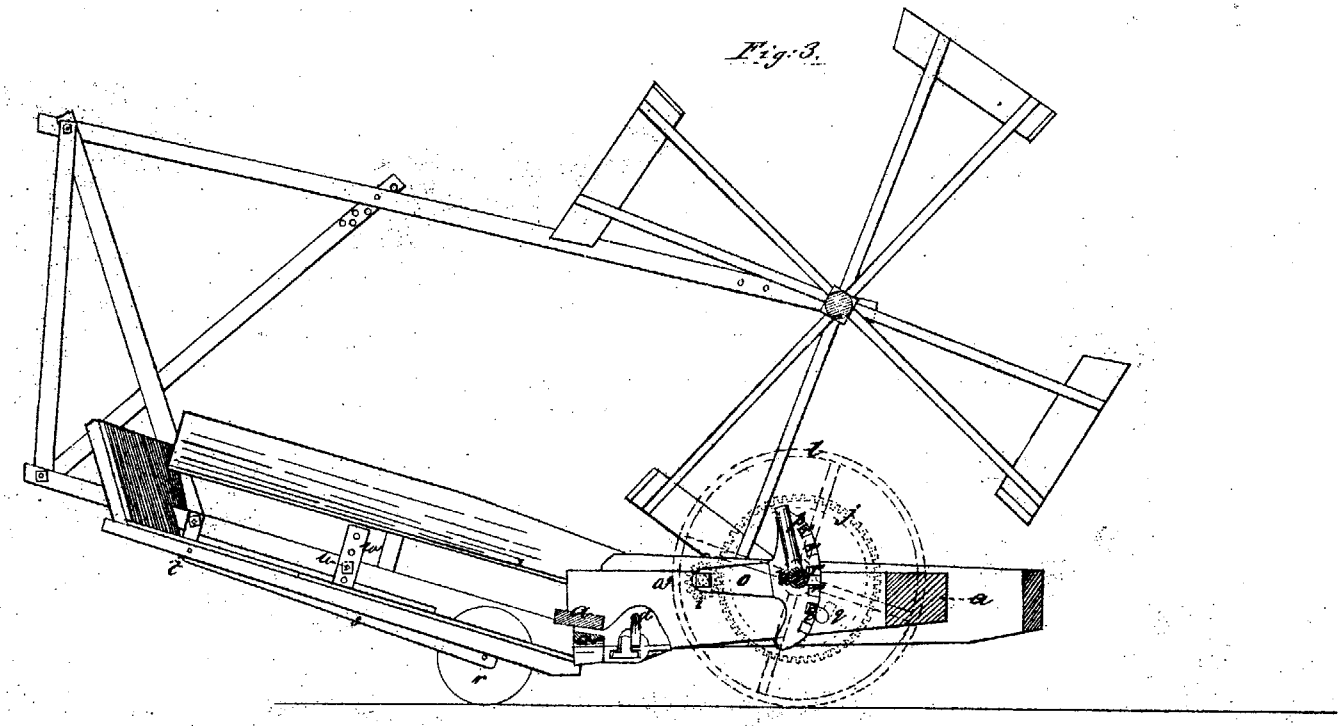
Witnesses.
Thos. H. Dodge
John P. Jacobs
C. H. McCormick

UNITED STATES PATENT OFFICE.

C. H. McCORMICK, OF CHICAGO, ILLINOIS, ASSIGNEE OF L. J. McCORMICK, WILLIAM S. McCORMICK, AND CYRUS H. McCORMICK.

IMPROVEMENT IN REAPING AND MOWING MACHINES.

Specification forming part of Letters Patent No. 20,212, dated May 11, 1858; Reissue No. 973, dated June 5, 1860; Reissue No. 1,255, dated January 7, 1862.

*To all whom it may concern:*

Be it known that LEANDER J. McCORMICK, WILLIAM S. McCORMICK, and CYRUS H. McCORMICK, all of Chicago, in the county of Cook and State of Illinois, have invented certain new and useful Improvements in Reaping and Mowing Machines, of which the following is a full, clear, and exact description, reference being had to the accompanying drawings, making part of this specification, in which—

Figure 1:
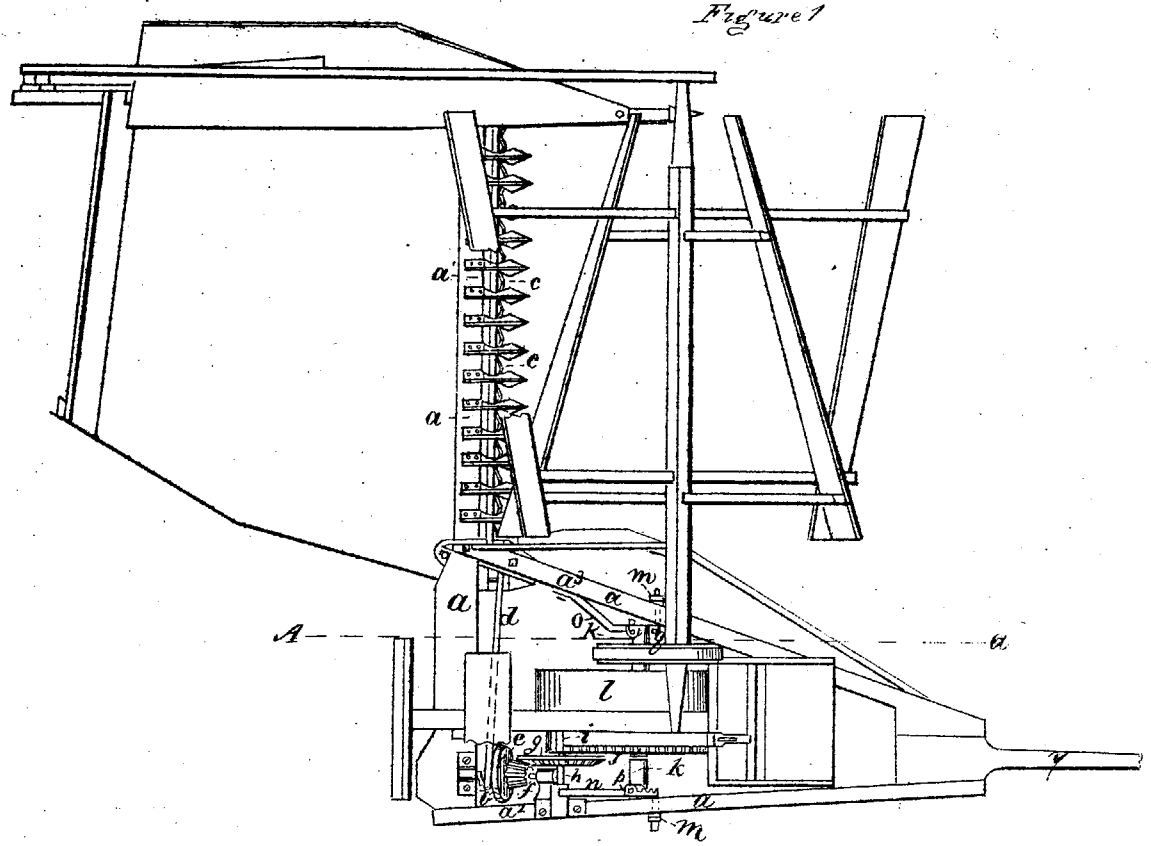
Figure 2:
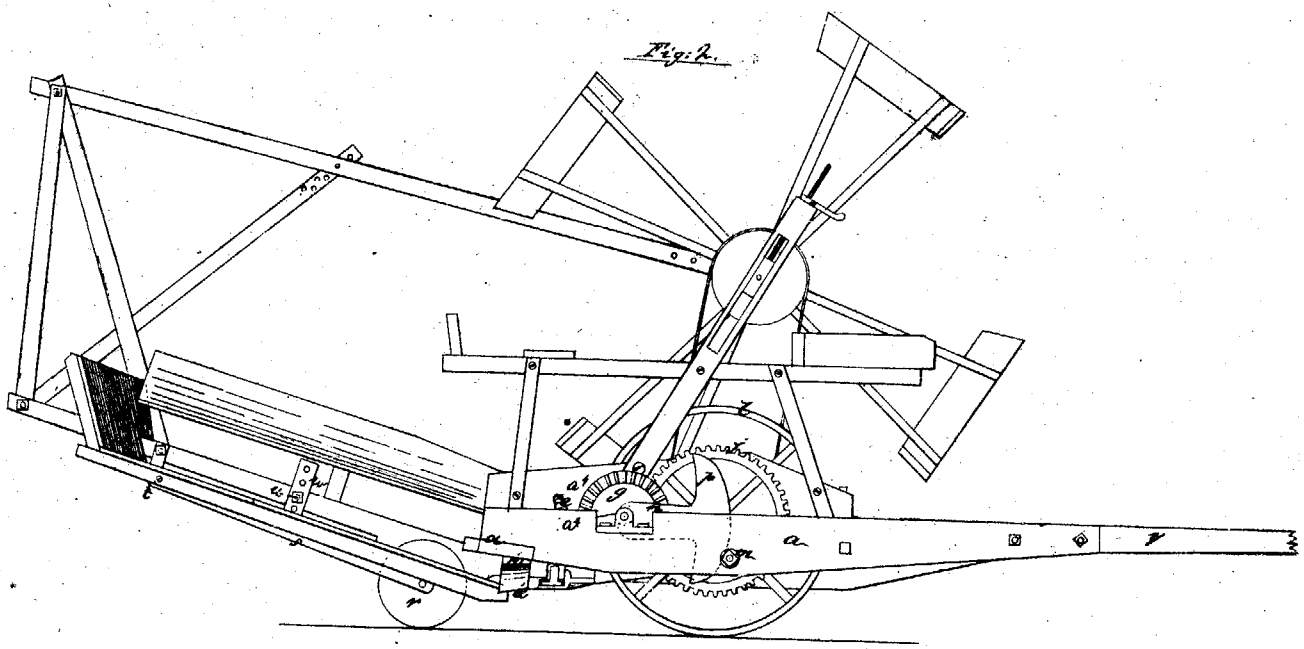

Figure 1 represents a plan of a McCormick reaping and mowing machine embracing said improvements. Fig. 2 represents a side elevation of the machine, and Fig. 3 represents a vertical section taken at the line A *a* of Fig. 1.

It is important that reaping and mowing machines should be so constructed that their cutting apparatus may be shifted and set at various heights from the surface of the ground, and that this may readily be done and still have their gearing to operate equally well at whatever height the cutter may be set.

The improvement which is the subject of this patent consists—

First. In connecting the driving-wheel with the frame of a reaping and mowing machine by means of a vibrating adjustable device or arm-connection, which shall at one end turn on or around the axis of the pinion-wheel that gears into and receives motion from the master cog wheel, while the other end, with which the axle or journal of the driving-wheel is connected, turns in the arc of a circle of which the axis of said pinion-wheel is the center. In these machines for cutting grain and grass, wherein the cutting is done by reciprocating blades or cutters working at right angles, or nearly so, to the line of motion of the machine, it is generally necessary to increase the motion generated by the driving and master wheels, and it is also necessary to change the line of motion from longitudinal to lateral in transmitting the motion to the cutter; and this improvement consists—

Secondly. In combining said arm or plate connection (of the driving-wheel with the frame of the machine) with gearing for changing the velocity and direction of the motion generated by the driving and master wheels and transmitting the same to the cutter.

In the accompanying drawings, which represent a McCormick reaping and mowing machine with the said improvements adapted thereto, the finger-beam *a'* and the draft pole or tongue *y* are placed at right angles, or thereabout, with each other, and connected by a strong frame, *a a a*, which is best made of a triangular form. This frame strengthens the connection of the draft-pole and the finger-beam, so as to insure a firm support for the cutting apparatus against the horizontal strains to which it is liable. The gearing of the said machine is arranged within the frame of the machine *a a a*. *b* is a crank-shaft, which communicates motion to the vibrating sickle *c* by a connecting-rod, *d*. This crank-shaft carries a fly-wheel, *e*, and a bevel-pinion, *f*, which receives motion from a bevel-wheel, *g*, on a shaft, *k*, which carries a pinion, *i*, receiving motion from the master cog-wheel *j* on the axle *k* of the driving and bearing wheel *l*. One journal of the shaft *h* runs in a box attached to the outside hound, $a^2$, and the other in a box attached to the central board or beam, $a^4$, of the frame.

The axle *k* of the driving and master wheels is mounted in the forward end of two arms or plates, *n o*. The arm *n* has its rear end fitted to turn on that box of the shaft *h* which is secured to the outside hound, and the other arm, *o*, is fitted to turn on a wrist-pin attached to the inside hound, $a^3$, and these two arms must be so mounted that they will turn or vibrate on the line of the axis of the shaft *h*, that carries the pinion *i*, that engages with and receives motion from the master-wheel *j*, so that this pinion and the master-wheel will continue in gear, notwithstanding the forward end of the arms may be elevated or depressed relatively to the frame.

The arms at their forward ends are formed in sectors *p p*, the inner faces of which along the forward edge are notched at given and equal distances apart to receive the heads of two screw-bolts, *q q*, (one for each sector,) that pass through holes in the hounds, the bolts being secured outside by screw-nuts *m*. By this means it will be seen that by loosening nuts *m* of the screw-bolts for adjustment the sector-arms carrying the driving and master wheels can be depressed or elevated, thus depressing or elevating the frame of the machine with one end of the cutting apparatus, and holding it at any desired elevation from the surface of the ground. The other end of the finger-bar and cutting apparatus can be elevated or depressed in a corresponding degree by having the guide-wheel *r* mounted in the forward end of a frame, *s*, the rear end of which turns on a fulcrum-pin, *t*. This frame is secured in any position desired, to suit the required elevation, by a screw-bolt, *u*, inserted in a series of holes in a standard, *w*, attached to and extending upward from the frame *s*, the holes in the standard being at different elevations to admit of the required adjustment.

Having shown one practical and good way to apply said improvements to use, it is manifest that they may be arranged to apply to other reaping and mowing machines.

What is claimed under this patent as the invention of the said LEANDER J. MCCORMICK, WILLIAM S. MCCORMICK, and CYRUS H. MCCORMICK is—

1. The combination of arms *n o* or their equivalent with the frame, pinion-wheel, and driving-wheel of a reaping or mowing machine, so that at one end said arms or equivalent shall vibrate or turn on or around the axis of the pinion-wheel, which gears into and receives motion from the master cog-wheel, and at the other end be properly connected with the axle or journal of the driving-wheel in such manner that by shifting adjustable fastenings the height of the frame and cutting apparatus of the machine relatively to that of the driving-wheel can be varied without affecting the gearing of the machine, substantially as described.

2. The combination of the arm or plate connection of the driving-wheel with the frame of the machine, substantially as described, or the equivalent thereof, with gearing for changing the velocity and direction of the motion generated by the driving and master wheels and communicating the same to the cutter.

3. The combination of said arm or plate connection with an adjustable wheel on the opposite side of the machine for raising and lowering the cutting apparatus to suit required changes in the height of cutting grain and grass.

In testimony whereof I have hereunto subscribed my name.

C. H. MCCORMICK.

Witnesses:
THOMAS H. DODGE,
JOHN P. JACOBS.